United States Patent
Brokaw et al.

(10) Patent No.: US 7,733,030 B2
(45) Date of Patent: Jun. 8, 2010

(54) SWITCHING POWER CONVERTER WITH CONTROLLED STARTUP MECHANISM

(75) Inventors: A. Paul Brokaw, Tucson, AZ (US); Trey Roessig, Fremont, CA (US)

(73) Assignee: Analog Devices, Inc., Norwood, MA (US)

(*) Notice: Subject to any disclaimer, the term of this patent is extended or adjusted under 35 U.S.C. 154(b) by 343 days.

(21) Appl. No.: 11/964,242

(22) Filed: Dec. 26, 2007

(65) Prior Publication Data
US 2009/0167200 A1 Jul. 2, 2009

(51) Int. Cl.
*H05B 37/00* (2006.01)
(52) U.S. Cl. .................. 315/209 R; 315/254; 315/276; 323/901; 323/908
(58) Field of Classification Search ............. 315/209 R, 315/254, 276; 323/901, 908
See application file for complete search history.

(56) References Cited

U.S. PATENT DOCUMENTS

| | | | |
|---|---|---|---|
| 7,579,784 B2 * | 8/2009 | Araki et al. | 315/209 R |
| 2008/0067985 A1 * | 3/2008 | Chang et al. | 323/222 |
| 2008/0224625 A1 * | 9/2008 | Greenfeld | 315/201 |
| 2009/0072754 A1 * | 3/2009 | Fukumoto | 315/279 |
| 2009/0184645 A1 * | 7/2009 | Buij et al. | 315/106 |
| 2009/0189546 A1 * | 7/2009 | Chien et al. | 315/307 |

* cited by examiner

*Primary Examiner*—Bao Q Vu
(74) *Attorney, Agent, or Firm*—Koppel, Patrick, Heybl & Dawson

(57) ABSTRACT

A switching power converter with a controlled startup mechanism includes a switching stage which provides a voltage $V_{out}$ at an output node in response to a switching control signal, with the output node adapted for connection to a non-linear load. A feedback network compares a signal which varies with the current conducted by the load ($I_{load}$) with a reference signal, and provides the switching control signal so as to maintain $I_{load}$ at a desired value. A capacitor connected to the output node provides a current $I_c$ to the feedback network which varies with $dV_{out}/dt$. The feedback network is arranged to limit $dV_{out}/dt$ in response to current $I_c$ when $I_{load}$ is substantially zero. In this way, large inrush currents or damage that might otherwise occur during startup are avoided.

24 Claims, 3 Drawing Sheets

SWITCHING POWER CONVERTER WITH CONTROLLED STARTUP MECHANISM

BACKGROUND OF THE INVENTION

1. Field of the Invention

This invention relates generally to switching power converters, and more particularly, to a switching converter with a startup mechanism which is useful when the load being driven is non-linear.

2. Description of the Related Art

Switching power converters can be configured using a number of different topologies, can be controlled with a wide variety of control methods, and can be used to drive different types of loads. One possible arrangement is shown in FIG. 1. In this example, a boost converter topology is employed, in which an inductor 10 is connected between an input voltage $V_{in}$ and a switching element—here, a transistor 12; a diode 14 is connected to the junction of the inductor and transistor, and the converter's output voltage $V_{out}$ appears on the cathode side of diode 14. $V_{out}$ drives a load 16—here, a diode—connected between $V_{out}$ and a node 20, and a resistor 22 having a resistance R1 is connected between node 20 and a common potential. A filter capacitor 24 is typically connected across load 16. When so arranged, the current $I_{load}$ in load 16 can be controlled by controlling the voltage at node 20.

The voltage at node 20 is controlled by means of a feedback circuit. An error amplifier 26 receives a reference voltage $V_{ref}$ at one input and is connected to node 20 at a second input. The output of the amplifier drives a controller 28 which operates transistor 12. In operation, controller 28 operates transistor 12 as needed to make $V_{out}$ the value needed to force the voltage at node 20 to $V_{ref}$, thus causing $I_{load}$ to be given by $V_{ref}/R1$.

However, a converter arranged as shown can encounter a problem during the "startup" phase of its operation. When $V_{out}$ is beginning to increase from zero, but is still below the forward voltage of diode 16, little to no current flows in resistor 22 and node 20 will be nearly equal to the common potential. With a voltage of zero at node 20, error amplifier 26 sees a large error and drives the controller to operate transistor 12 at a maximum duty ratio not controlled by feedback. This causes the average inductor current to rise rapidly, possibly to a level at which it saturates inductor 10 and possibly damages transistor 12.

SUMMARY OF THE INVENTION

A switching power converter with a controlled startup mechanism is presented which overcomes the problem noted above, in that a controlled startup of the converter is achieved even when the non-linear characteristics of the load cause there to be no feedback information during startup. The converter is particularly useful when used to control the current in a diode load, especially when a relatively large output voltage is needed to drive one or more diodes or light-emitting diodes (LEDs).

The present switching power converter includes a switching stage arranged to provide a voltage $V_{out}$ at an output node in response to a switching control signal, with the output node adapted for connection to a non-linear load. A feedback network is provided to compare a signal which varies with the current conducted by the load ($I_{load}$) with a reference signal, and to provide the switching control signal to the switching stage so as to maintain $I_{load}$ at a desired value. The converter also includes a capacitor connected to the output node and arranged to provide a current $I_c$ to the feedback network which varies with $dV_{out}/dt$. The feedback network is arranged to limit $dV_{out}/dt$ in response to current $I_c$ when $I_{load}$ is substantially zero. In this way, large inrush currents or damage that might otherwise occur during startup are avoided.

These and other features, aspects, and advantages of the present invention will become better understood with reference to the following drawings, description, and claims.

DETAILED DESCRIPTION OF THE INVENTION

Figure 2:
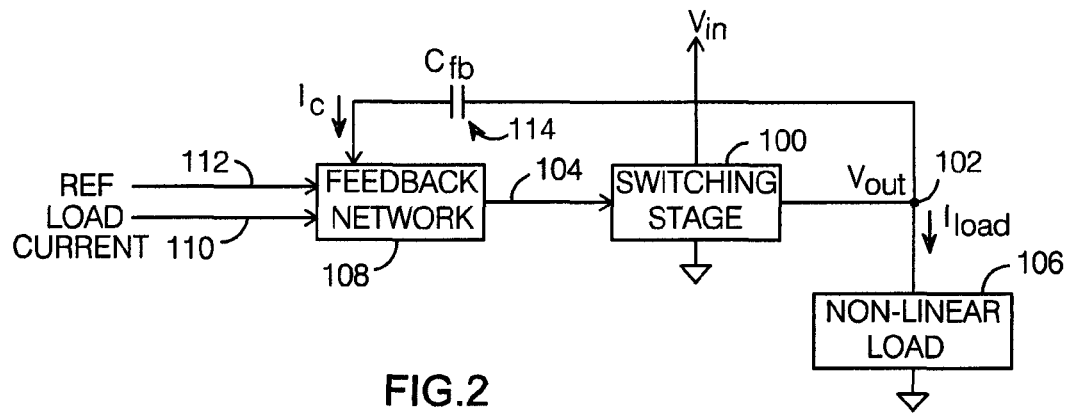
FIG. 2 is a block diagram illustrating the principles of a switching power converter with a controlled startup mechanism per the present invention.

The principles of a switching power converter with a controlled startup mechanism per the present invention are illustrated in FIG. 2. The converter includes a switching stage 100 which would include the inductor and switching elements found in a switching converter; switching stage 100 provides the converter's output voltage $V_{out}$ at an output node 102 in response to a switching control signal 104. Output node 102 is adapted for connection to a non-linear load 106. As used herein, a non-linear load is any load for which the current conducted by the load ($I_{load}$) does not vary linearly with the voltage applied across it. For example, one application for the present converter is the driving of one or more series-connected diodes such as light-emitting diodes (LEDs), in which the converter regulates the diode's cathode voltage so as to cause a desired current to flow in the diode. The converter is particularly useful when $V_{out}$ must be relatively large, as might be needed when the load is more than a single diode, or an LED with a high forward voltage.

The converter also includes a feedback network 108 arranged to compare a signal 110 which varies with $I_{load}$ with a reference signal 112 and to provide switching control signal 104 to switching stage 100 so as to reduce the error between signals 110 and 112 and thereby maintain $I_{load}$ at a desired value.

To provide a controlled startup, the converter also includes a capacitor 114 having a capacitance $C_{fb}$. The capacitor is connected at one terminal to output node 102 such that it provides a current $I_c$ to feedback network 108 which varies with $dV_{out}/dt$. Feedback network 108 is arranged to limit $dV_{out}/dt$ in response to current $I_c$ when $I_{load}$ is substantially zero. This can occur when load 106 is one or more diodes, for example. As the converter starts up, there is a period during which $V_{out}$ is increasing but has not yet reached the diode's turn-on voltage; load current feedback signal 110 is essentially zero during this time. By providing capacitor 114 and current $I_c$ as described herein, and arranging feedback network 108 to limit $dV_{out}/dt$ in response to $I_c$ when $I_{load}$ is substantially zero, $dV_{out}/dt$ can be limited so that large inrush currents or damage that might otherwise occur during startup are avoided.

Figure 3:
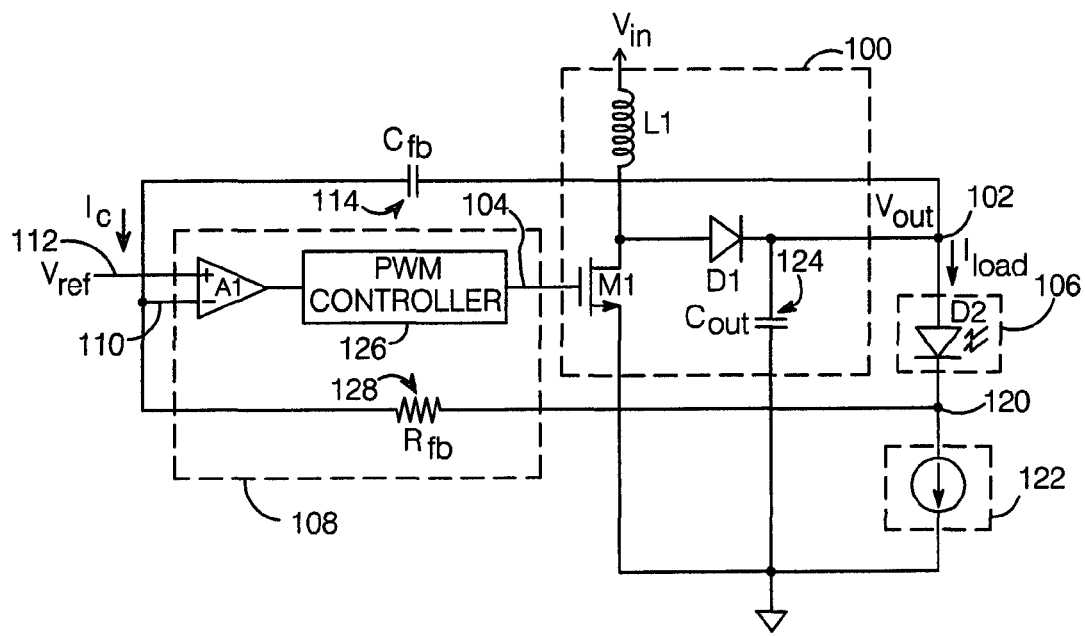
FIG. 3 is a block/schematic diagram of one possible embodiment of a switching power converter with a controlled startup mechanism per the present invention.

One possible implementation of a switching converter per the present invention is shown in FIG. 3. In this example, switching stage 100 is arranged in a boost converter configuration, though the startup mechanism described herein is applicable to other switching converter topologies as well. In the boost arrangement shown, an inductor L1 is connected between input voltage $V_{in}$ and a switching transistor M1, a diode D1 is connected to the junction of L1 and M1, and output voltage $V_{out}$ appears on the cathode side of D1. $V_{out}$ drives non-linear load 106—here, an LED D2—connected between $V_{out}$ and a node 120, and a current regulating element 122 is connected between node 120 and a common potential which can include ground. A filter capacitor 124 having a capacitance $C_{out}$ is typically connected across load 106. Current regulating element 122 can be, for example, a resistor, a fixed current source, or a programmable current source.

Feedback network 108 includes an error amplifier A1, the output of which drives a pulse-width modulated (PWM) controller 126. Here, reference signal 112 is a reference voltage $V_{ref}$ connected to the non-inverting input of A1, and capacitor 114 is connected between output node 102 and A1's inverting input. A resistor 128 having a resistance $R_{fb}$ is connected between A1's inverting input and node 120, thereby providing signal 110 which varies with $I_{load}$ to feedback network 108. As long as $R_{fb}$ is sufficiently large, it will have a negligible effect on $I_{load}$, and signal 110 will be essentially equal to the voltage at node 120.

After the converter has been started, it operates to maintain the voltage at node 120 equal to $V_{ref}$. The voltage at node 120 in combination with current regulating element 122 operates to regulate the current in LED D2. For example, if $V_{ref}$ is 300 mv and current regulating element 122 is a resistor having a resistance of 0.6Ω, the current through the resistor—and thus through D2—is given by 300 mv/0.6Ω=500 ma. The converter regulates $V_{out}$ to cause 500 ma to flow in D2 by ensuring that node 120 is maintained at 300 mv. The programmed current—500 ma in this example—can be changed by changing either $V_{ref}$ or the resistance value of element 122. The steady state may be disturbed by a change in the programmed current, $V_{in}$, or temperature-sensitive changes in load 106, but the closed loop will restore the load current by adjusting $V_{out}$.

This arrangement works well as long as the converter has been started and $V_{out}$ has increased to a point at which diode D2 is forward-biased and conducting. When D2 is conducting, the small-signal voltages at D2's anode and cathode are approximately the same. Low-frequency feedback information passes through resistor 128, and high-frequency feedback information passes through capacitor 114. Since the AC small-signal voltages at the anode and cathode of D2 are the same, the transfer function from $V_{out}$ to feedback node 110 (ignoring parasitics) is simply 1.

During startup, when V2 has not yet increased to the point at which D2 is conducting, node 120 is essentially at zero volts and therefore provides no feedback information to feedback node 110. However, feedback information still reaches node 110 via capacitor 114. The feedback information is in the form of the current $I_c$ conducted by capacitor 114. Since capacitor 114 is connected on one side to $V_{out}$, $I_c$ will vary with $dV_{out}/dt$, and since capacitor 114 is connected in series with resistor 128, $I_c$ will also flow in resistor 128. In this way, capacitor 114 acts to provide a pullup current proportional to the derivative of $V_{out}$ at node 110.

When so arranged, the current into feedback node 110 is given by:

$$I_{in}=C_{fb}[d(V_{out}-V_{fb})/dt]$$

and the current out of feedback node 110 is given by: $I_{out}=(V_{fb}-V_{cath})/R_{fb}$, where $V_{fb}$ is the voltage at node 110 and $V_{cath}$ is the voltage at the node 120.

Since $I_{in}=I_{out}$:

$$C_{fb}[d(V_{out}-V_{fb})/dt]=(V_{fb}-V_{cath})/R_{fb}, \text{ and then:}$$

$$d(V_{out}-V_{fb})/dt=(1/C_{fb})[(V_{fb}-V_{cath})/R_{fb}].$$

However, during startup, $V_{fb}$ is essentially zero and thus:

$$dV_{out}/dt=(1/C_{fb})[(V_{fb}-V_{cath})/R_{fb}].$$

Controller 126 forces $V_{fb}$ to be equal to $V_{ref}$. When D2 is conducting and the loop is stable, $dV_{out}/dt$ is zero, and $V_{fb}$ is approximately equal to $V_{cath}$. But when $V_{out}$ is too low to forward-bias D2, $V_{cath}$ is zero, resulting in a well-controlled value for $dV_{out}/dt$, with $V_{out}$ increasing at a ramp rate determined by the $C_{fb}R_{fb}$ time constant.

A converter in accordance with the present invention could be arranged such that capacitor 114 is located on-chip with other converter components, or could be external to the chip so that a user can program a desired startup ramp rate.

As noted above, current regulating element 122 can be a programmed current source, which may be desirable for some applications, and which provides several advantages over the use of a resistor. For example, when using a resistor, the ripple voltage on $V_{out}$ modulates the load current and thus the LED output. With a current source, the LED current is controlled independent of the $V_{out}$ ripple, and the error amplifier averages out the ripple from the control function. Another feature of using a programmed current source is that several additional LED strings can be driven by $V_{out}$ and by their individual current sources, to the same or even different currents. The feedback loop of FIG. 3 will provide $V_{out}$ so that there will be enough headroom for the various current sources, but can control based on, for example, the highest expected LED voltage.

A programmed current source can also be provided which enables the programmed current to be switched rapidly to various values including zero. This allows the LED current to be patterned for applications such as visual displays. The programmed current source can be made to switch much faster than the switching converter can change the output voltage, if, for example, $V_{ref}$ was adjusted to control the current in a resistor. When operated with a programmed current source, the variations of voltage across the LED which result from the rapid changes show up at inverting input 110 of error amplifier A1, where they will signal the loop to adapt. The loop will respond as fast as it can, but in the meantime the LED current will have been changed and the LED output will be unaffected by slow settling, so long as the original value of $V_{out}$ was enough to accommodate the changes in LED voltage.

Figure 4:
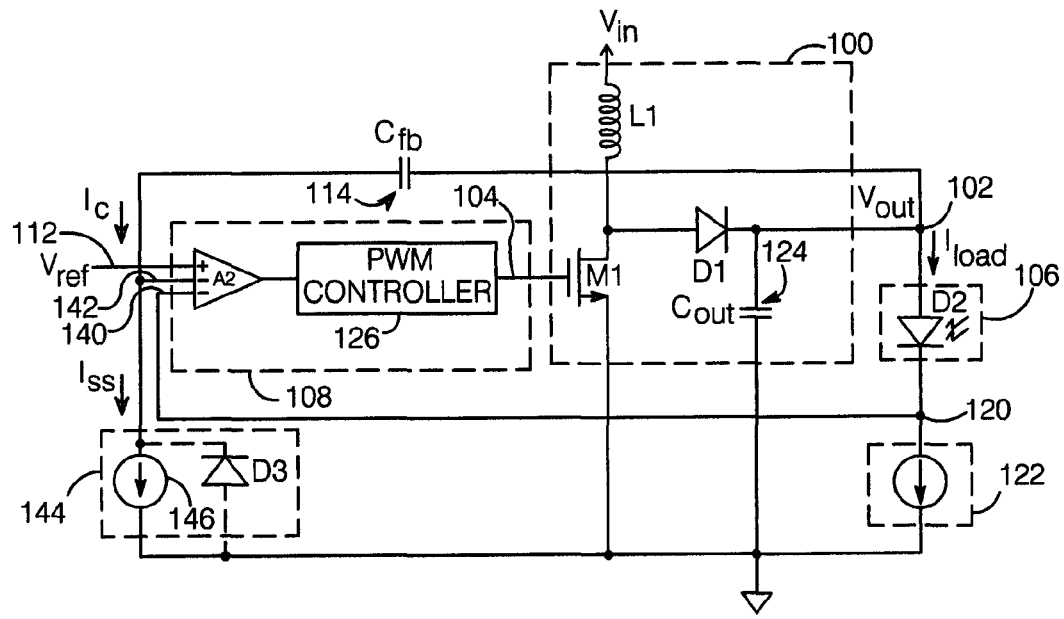
FIG. 4 is a block/schematic diagram of another possible embodiment of a switching power converter with a controlled startup mechanism per the present invention.

Another possible implementation of a switching converter per the present invention is shown in FIG. 4. Switching stage 100 is again shown in a boost converter configuration, though other converter topologies could also be employed. Here, error amplifier (A2) has an additional inverting input, and is made so that either of its two inverting inputs can be used to balance the non-inverting input. One of the inverting inputs (140) is coupled to node 120 to provide a feedback signal that varies with load current during normal operation after startup. The other inverting input (142) is coupled to feedback capacitor 114, and to a current regulating element 144 connected to circuit common; in FIG. 4, element 144 is shown as a current source 146 which conducts a current $I_{ss}$.

Initially, current $I_{ss}$ will pull input 142 to common, and current regulating element 122 pulls input 140 to common. Upon starting, PWM controller 126 will try to raise the inductor current as fast as it can, but then $V_{out}$—i.e., the voltage on the right side of capacitor 114—will go up, and shortly thereafter the voltage on the left side of capacitor 114 will be at the $V_{ref}$ voltage. This causes the output of error amp A2 to fall to a value that will reduce the duty ratio to hold the current in capacitor 114 constant and equal to $I_{ss}$, and thereby keep node 142 at the $V_{ref}$ voltage. The result is that the current charging the filter capacitor 124 will be in the ratio to $I_{ss}$ that filter capacitor capacitance $C_{out}$ is to $C_{fb}$.

When LED D2 begins to draw current, it will pull up inverting input 140. When input 140 approaches $V_{ref}$, PWM controller 126 will be backed off by error amp A2 to maintain the steady state load current at the programmed level, so that $dV_{out}/dt$ will drop and the voltage at inverting input 142 will drop toward common. This makes a smooth handoff between approximately constant current to charge $C_{out}$ to its operating level, and then maintaining a constant operating current in LED D2 as set by the programmed current.

The converter of FIG. 4 could be arranged to optimize the startup—i.e., to make it as fast as it can be without exceeding safe current limits. The user might be given the option to set $C_{fb}$, $C_{out}$, and/or $I_{ss}$.

A clamp diode D3 could be connected across current source 146 to prevent node 142 from being driven negative, and to discharge capacitor 114 when the circuit turns off.

Figure 5:
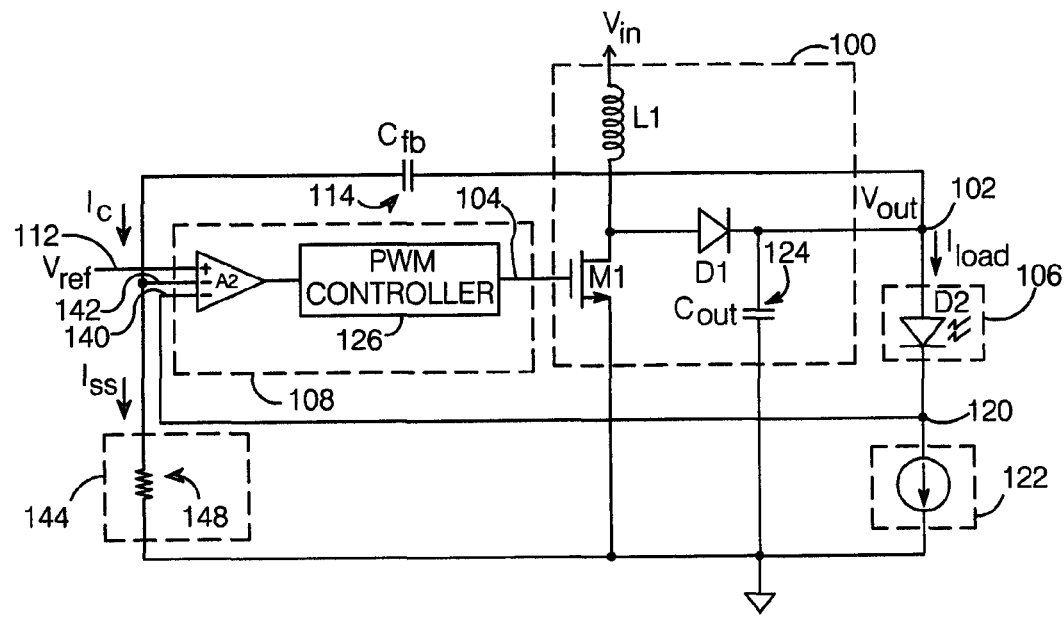
FIG. 5 is a block/schematic diagram of another possible embodiment of a switching power converter with a controlled startup mechanism per the present invention.

For a given the $V_{ref}$ voltage, current regulating element 144 could be implemented with a resistor 148 to common, which would deliver a constant current when balanced at $V_{ref}$; this possibility is illustrated in FIG. 5. Assuming that the programmed current can be accurately set on-chip, then a current $I_{ss}$ as shown in FIG. 4 can be generated accurately as well. This would avoid the need for an accurate resistor on-chip, in addition to an accurate current, thereby making FIG. 4 the preferred arrangement.

If fast, optimized, starting is not required, then the entire circuit can be on-chip. In this case, $V_{out}$ would rise with a $dV_{out}/dt$ fixed by capacitance value $C_{fb}$ and either $I_{ss}$ or the resistor 148 and $V_{ref}$ voltage. In that case, there would be a maximum safe value for $C_{out}$, and the turn-on time would be set for the corresponding maximum.

Figure 1:
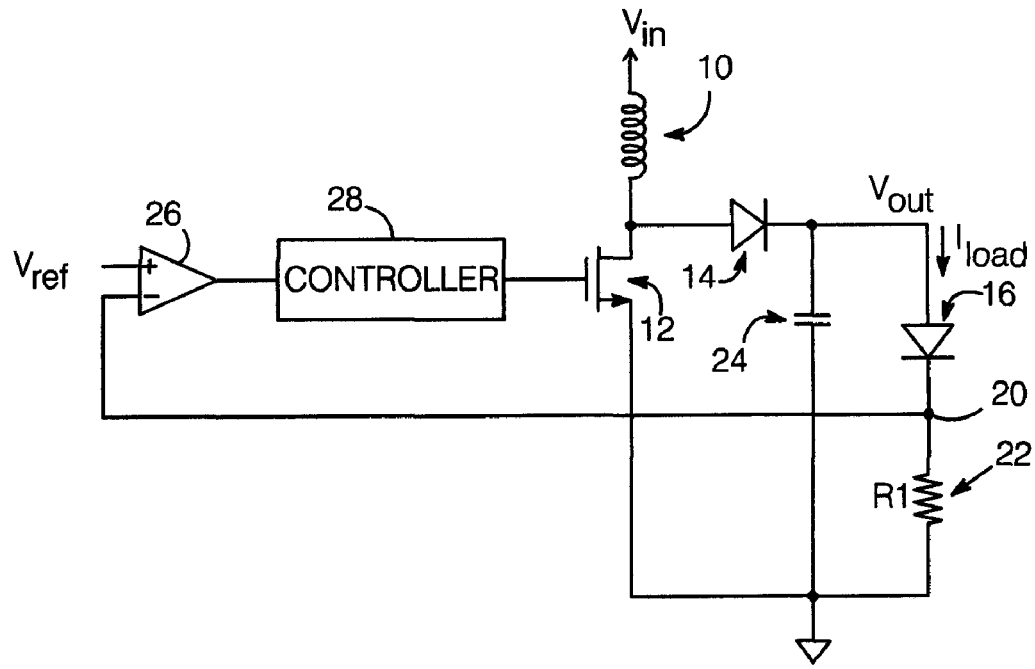
FIG. 1 is a block/schematic diagram of a known switching power converter driving a non-linear load.
Figure 6:
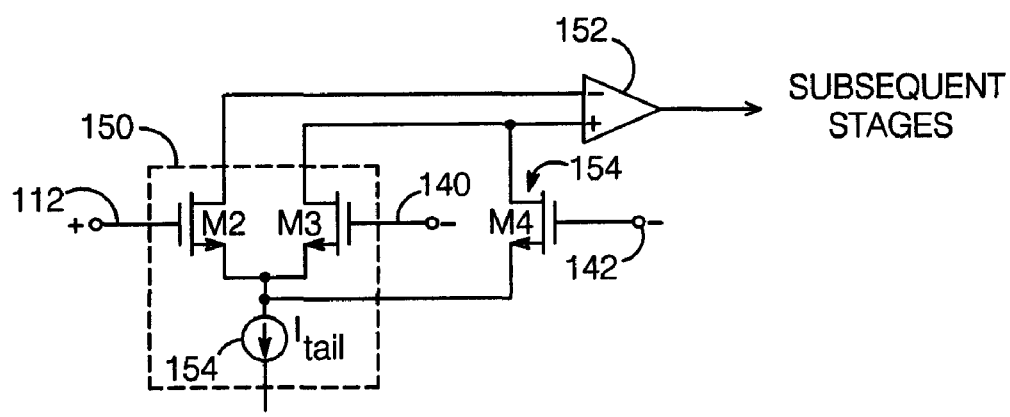
FIG. 6 is a schematic diagram of an input stage of an error amplifier having three inputs, as might be used with the embodiments shown in FIGS. 4 and 5.

One possible way of implementing three-input error amplifier A2 is shown in FIG. 6, which depicts just the input stage of such an amplifier. In addition to the usual differential stage 150 (comprising transistors M2 and M3) driving a second stage (152) and perhaps subsequent stages, a third transistor M4 has been added to the input stage, the gate terminal of which provides the amplifier's second inverting input; a current source 154 provides a tail current $I_{tail}$ for all three transistors. Referring to FIG. 5, the gate of transistor M2 corresponds to the amplifier non-inverting input 112, the gate of transistor M3 corresponds to input 140 connected to feedback node 120, and the gate of transistor M4 corresponds to input 142 connected to current regulating element 144.

Initially, inputs 140 and 142 are both low. As such, all of $I_{tail}$ goes through M2, thereby causing controller 126 to operate at the maximum duty ratio. As $V_{out}$ starts to increase, the current $I_c$ through $C_{fb}$ pulls up input 142, bringing it close to $V_{ref}$. This condition will be stable for a while, with controller 126 operating such that a constant current charges $C_{out}$, so as to generate $dV_{out}/dt$ to make $C_{fb}$ supply the $I_{ss}$ current.

Eventually, $V_{out}$ will get high enough to cause load 106 to conduct current, and node 120 and input 140 will rise. As input 140 approaches $V_{ref}$, it diverts some of $I_{tail}$ to the M3 side of differential stage 150, causing controller 126 to reduce the duty ratio. This reduces $dV_{out}/dt$, allowing $I_{ss}$ to pull input 142 down, switching off M4 and stabilizing $V_{out}$ at a level to make the load current correct, and $dV_{out}/dt \approx 0$.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A switching power converter with controlled startup mechanism, comprising:
    a switching stage arranged to provide a voltage $V_{out}$ at an output node in response to a switching control signal, said output node adapted for connection to a non-linear load;
    a feedback network arranged to compare a signal which varies with the current ($I_{load}$) conducted by said load with a reference signal and to provide said switching control signal to said switching stage so as to maintain $I_{load}$ at a desired value; and
    a capacitor connected to said output node and arranged to provide a current $I_c$ to said feedback network which varies with $dV_{out}/dt$, said feedback network further arranged to limit $dV_{out}/dt$ in response to said current $I_c$ when $I_{load}$ is substantially zero.

2. The converter of claim 1, wherein said non-linear load is connected between said output node and a second node, further comprising a current regulating element connected to conduct a current from said second node to a common potential.

3. The converter of claim 2, wherein said reference signal is a reference voltage $V_{ref}$ and said feedback network is arranged to adjust $V_{out}$ as needed to make the voltage at said second node equal to $V_{ref}$, said voltage at said second node and said current regulating element thereby establishing $I_{load}$.

4. The converter of claim 2, wherein said current regulating element is a current source.

5. The converter of claim 4, wherein said current source is a programmable current source.

6. The converter of claim 2, wherein said current regulating element is a resistor.

7. The converter of claim 1, wherein said feedback network comprises:
    an error amplifier which receives a voltage $V_{fb}$ at a first input which varies with $I_{load}$ and said reference signal at a second input and which produces an output which varies with the difference between the voltages at its inputs; and
    a controller which receives the output of said error amplifier and provides said switching control signal in response;
    said capacitor connected between said output node and said first input such that said capacitor conducts a pullup current proportional to the derivative of $V_{out}$ to said first input.

8. The converter of claim 7, wherein said non-linear load is connected between said output node and a second node, further comprising a feedback resistor having a resistance $R_{fb}$ connected between said second node and said first input such that:

$$d(V_{out}-V_{fb})/dt=(1/C_{fb})[(V_{fb}-V_2)/R_{fb}],$$

where $V_2$ is the voltage at said second node and $C_{fb}$ is the capacitance of said capacitor.

9. The converter of claim 1, wherein said feedback network comprises:

an error amplifier having a first input connected to a first node, a second input which receives a voltage $V_{fb}$ that varies with $I_{load}$ and a third input connected to said reference signal, and which produces an output which varies with the differences between the voltages at its inputs;

a current regulating element arranged to conduct a current $I_{ss}$ from said first node to a common potential; and a controller which receives the output of said error amplifier and provides said switching control signal in response;

said capacitor connected between said output node and said first node such that said capacitor conducts a pullup current proportional to the derivative of $V_{out}$ at said first node.

10. The converter of claim 9, wherein said current regulating element is a fixed resistance.

11. The converter of claim 9, wherein said current regulating element is a current source.

12. The converter of claim 9, wherein said reference signal is a reference voltage, said error amplifier arranged such that its output varies with the difference between the voltages at its first and third inputs when $I_{load}$ is substantially zero, and varies with the difference between the voltages at its second and third inputs when $I_{load}$ causes $V_{fb}$ to be approximately equal to said reference voltage.

13. The converter of claim 1, wherein said non-linear load is one or more series-connected diodes.

14. The converter of claim 13, wherein said diode is one or more series-connected light-emitting diodes (LEDs).

15. The converter of claim 1, further comprising a filter capacitor connected across said load.

16. The converter of claim 1, wherein said switching converter is a boost converter.

17. The converter of claim 1, wherein said non-linear load is a plurality of light-emitting diode (LED) strings, each of which comprises one or more LEDs connected in series.

18. The converter of claim 1, wherein said non-linear load is a plurality of light-emitting diode (LED) strings connected in parallel, each of said strings comprising one or more LEDs.

19. A switching power converter with controlled startup mechanism, comprising:

a switching stage comprising a switching element arranged to control the current through an inductor in response to a switching control signal, said switching stage producing an output voltage $V_{out}$ at said output node;

a second node, said output node and second node adapted for connection across a non-linear load;

a current regulating element connected to conduct a current from said second node to a common potential;

an error amplifier which receives a voltage $V_{fb}$ at a first input which varies with the current conducted by said load ($I_{load}$) and a reference voltage $V_{ref}$ at a second input and which produces an output which varies with the difference between the voltages at its inputs;

a pulse-width modulated (PWM) controller which receives the output of said error amplifier and provides said switching control signal to said switching stage so as to maintain $I_{load}$ at a desired value; and a capacitor having a capacitance $C_{fb}$ connected between said output node and said first input such that said capacitor conducts a pullup current proportional to the derivative of $V_{out}$ at said first input such that $dV_{out}/dt$ is controlled when $I_{load}$ is substantially zero;

wherein said converter is arranged to adjust $V_{out}$ as needed to make the voltage at said second node equal to $V_{ref}$, said voltage at said second node and said current regulating element thereby establishing $I_{load}$.

20. The converter of claim 19, further comprising a feedback resistor having a resistance $R_{fb}$ connected between said output node and said first input such that:

$$d(V_{out}-V_{fb})/dt=(1/C_{fb})[(V_{fb}-V_2)/R_{fb}],$$

where $V_2$ is the voltage at said second node.

21. A switching power converter with controlled startup mechanism, comprising:

a switching stage comprising a switching element arranged to control the current through an inductor in response to a switching control signal, said switching stage producing an output voltage $V_{out}$ at said output node;

a second node, said output node and second node adapted for connection across a non-linear load;

a first current regulating element connected to conduct a current from said second node to a common potential;

an error amplifier having a first input connected to a first node, a second input which receives a voltage $V_{fb}$ that varies with the current conducted by said load ($I_{load}$) and a third input connected to a reference voltage, said error amplifier arranged such that its output varies with the difference between the voltages at its first and third inputs when $I_{load}$ is substantially zero, and varies with the difference between the voltages at its second and third inputs when $V_{fb}$ is approximately equal to said reference voltage;

a second current regulating element connected to conduct a current $I_{ss}$ from said first node to a common potential;

a pulse-width modulated (PWM) controller which receives the output of said error amplifier and provides said switching control signal to said switching stage so as to maintain $I_{load}$ at a desired value; and a capacitor having a capacitance $C_{fb}$ connected between said output node and said first node such that said capacitor conducts a pullup current $I_{cfb}$ which is proportional to the derivative of $V_{out}$ at said first node;

wherein said converter is arranged to adjust $V_{out}$ as needed to make the voltage at said second node equal to $V_{ref}$, said voltage at said second node and said current regulating element thereby establishing $I_{load}$.

22. The converter of claim 21, further comprising a filter capacitor having a capacitance $C_{out}$ connected across said load which conducts a current $I_{Cout}$, said converter arranged such that $I_{cfb}/I_{Cout}=C_{fb}/C_{out}$.

23. The converter of claim 21, wherein said first and second current regulating elements are respective current sources.

24. The converter of claim 23, further comprising a diode connected across said first current regulating element to prevent said first node from being driven to a negative potential by said current source.

* * * * *